United States Patent
Seal

(10) Patent No.: US 8,021,461 B2
(45) Date of Patent: Sep. 20, 2011

(54) REMEDIAL HEAP TREATMENT

(75) Inventor: Thomas Joseph Seal, Elko, NV (US)

(73) Assignee: Newmont USA Limited, Denver, CO (US)

( * ) Notice: Subject to any disclaimer, the term of this patent is extended or adjusted under 35 U.S.C. 154(b) by 665 days.

(21) Appl. No.: 10/591,052

(22) PCT Filed: Mar. 18, 2005

(86) PCT No.: PCT/US2005/008995
§ 371 (c)(1),
(2), (4) Date: Aug. 28, 2006

(87) PCT Pub. No.: WO2005/090748
PCT Pub. Date: Sep. 29, 2005

(65) Prior Publication Data
US 2007/0186724 A1 Aug. 16, 2007
US 2011/0107877 A2 May 12, 2011

Related U.S. Application Data

(60) Provisional application No. 60/554,695, filed on Mar. 19, 2004.

(51) Int. Cl.
*B01D 11/02* (2006.01)
*B01F 1/00* (2006.01)
*C22B 3/04* (2006.01)
*C22B 3/06* (2006.01)
*C22B 3/08* (2006.01)
*C22B 3/12* (2006.01)
*E21B 43/28* (2006.01)

(52) U.S. Cl. ............... 75/743; 75/711; 75/712; 75/744; 299/4; 299/5; 423/27; 423/98; 423/109; 423/150.1

(58) Field of Classification Search . 299/5, 188.3–192.8
See application file for complete search history.

(56) References Cited

U.S. PATENT DOCUMENTS 3,441,316 A * 4/1969 Hannifan et al. ............ 299/5
3,815,957 A * 6/1974 Spedden et al. ............ 299/5

(Continued)

FOREIGN PATENT DOCUMENTS

WO   WO 03/068999 A1   8/2003

OTHER PUBLICATIONS

Milsom, John. Field Geophysics 3rd Edition. Apr. 4, 2003. Wiley. p. 290 Available from: http://www.myilibrary.com/Browse/open.asp?ID=27110&loc=Cover Oct. 8, 2008.*

*Primary Examiner* — Melvin C Mayes
*Assistant Examiner* — Colin W Slifka
(74) *Attorney, Agent, or Firm* — Marsh Fischmann & Breyfogle LLP

(57) ABSTRACT

A system and method are disclosed for improving component extraction from heap leach operations. Following heap leaching for some time, portions of the heap deficient in component extraction are identified, and treatment wells are drilled and remedial treatments are selectively performed on the identified portions of the heap. The remedial treatment can include hydraulically fracturing the identified portions of the heap followed by selective treatment with leach solution of the area impacted by the fracturing.

45 Claims, 7 Drawing Sheets

U.S. PATENT DOCUMENTS

| | | | |
|---|---|---|---|
| 3,822,916 A | 7/1974 | Jacoby | 299/4 |
| 3,834,760 A | 9/1974 | Spedden et al. | 299/5 |
| 3,951,458 A | 4/1976 | Cathles et al. | 299/5 |
| 4,071,278 A | 1/1978 | Carpenter et al. | 299/5 |
| 4,318,892 A | 3/1982 | Von Kohorn | 422/279 |
| 4,346,936 A * | 8/1982 | Yan | 299/4 |
| 4,381,873 A | 5/1983 | Johnson et al. | 299/5 |
| 4,652,309 A | 3/1987 | Bodine | 75/101 R |
| 4,728,152 A | 3/1988 | Pike et al. | 299/17 |
| 4,756,887 A | 7/1988 | Lesty et al. | 427/20 |
| 5,100,631 A | 3/1992 | Gross | 423/29 |
| 5,223,024 A * | 6/1993 | Jones | 75/743 |
| 5,537,045 A | 7/1996 | Henderson | 324/557 |
| 5,825,188 A | 10/1998 | Montgomery et al. | 324/357 |
| 6,123,394 A | 9/2000 | Jeffrey | 299/16 |
| 6,471,743 B1 * | 10/2002 | Young et al. | 75/739 |

* cited by examiner

REMEDIAL HEAP TREATMENT

CROSS-REFERENCE TO RELATED APPLICATION

This application claims a benefit under 35 U.S.C. §119(e) to U.S. Provisional Patent Application No. 60/554,695 entitled "REMEDIAL HEAP TREATMENT INVOLVING HYDRAULIC FRACTURING" filed Mar. 19, 2004.

FIELD OF THE INVENTION

The present invention relates to heap leaching of materials to extract one or more component of the material; and especially with application to remedial treatment of heaps to improve heap leach extraction of metal values from metal-containing mineral materials.

BACKGROUND OF THE INVENTION

One technique for extracting metal from ores and other mineral material is to heap leach the material. An engineered pile, or heap, of particulate material is constructed, typically over an engineered liner and liquid collection system. Leach solution is applied to and percolated through the heap to contact the material and dissolve one or more metal of interest into the leach solution. Pregnant leach solution is collected through the collection system and is then processed to recover the dissolved metal.

A common problem with heap leaching is nonuniform leaching of metals from the heap. Even after extensive leaching, some portions of the heap often remain under-leached or even substantially un-leached. For example, leach solution often does not uniformly contact all portions of the heap because of permeability variations that exist within the heap. Such permeability variations may result in preferential flow of leach solution through higher permeability portions of the heap, leaving lower permeability portions under-leached or un-leached. As another example, the chemical properties in some portions of the heap may be less conducive to dissolution of the metal into the leach solution. For example, when heap leaching gold with cyanide leach solution under alkaline conditions, low pH spots within the heap may not respond well to the alkaline leach solution, leaving those portions under-leached or un-leached.

Metals remaining in under-leached and un-leached portions of a heap following heap leach operations often represent a significant loss.

SUMMARY OF THE INVENTION

The invention is directed to improving extraction of component(s) of interest from heaps, and involves remedial treatment of a selected portion or portions of the heap. For purposes of discussion herein, the invention is exemplified by a preferred application of the invention involving treatment of heaps comprising metal-containing mineral material for extraction of the metal of interest. In its broadest sense, however, the invention is not so limited and is applicable also to treatment of heaps in which the object is to extract some other material, such as for example, a mineral or a compound.

With respect to the application of the invention involving extraction of metal from metal-containing mineral material, after a heap initially comprising the metal-containing mineral material has undergone heap leaching for some period of time to leach metal, the heap is surveyed to identify portions of the heap deficient in metal extraction that may be candidates for remedial treatment. For an identified portion of the heap determined to be deficient in metal extraction, a treatment well is drilled, or otherwise excavated, into that portion of the heap and targeted remedial treatment of that portion is performed through the well.

The remedial treatment can be any targeted treatment of the identified portion of the heap that is performable through the well for altering some condition or conditions within the heap to assist metal extraction from that portion of the heap. Such remedial treatment typically involves injection of treatment fluid(s), often including one or more aqueous liquid, with or without dissolved or entrained gasses, into the heap to modify properties within a portion of the heap. A common condition often contributing to deficiency in metal extraction is poor infiltration of heap leach fluids into that portion of the heap, often because of low local permeability, and remedial treatment involves permeability enhancement of a portion of the heap through hydraulic fracture treatment.

In one implementation of the invention, the remedial treatment comprises hydraulically fracturing an identified portion of the heap determined to be deficient in metal extraction, with the hydraulic fracturing followed by direct placement of treating solution into the identified portion of the heap to extract metal. The treating solution is a leach solution for metal to be extracted, and may be the same as leach solution applied to the top of the heap during normal heap leaching operations. In this implementation, the direct placement of the treating solution is accomplished by injecting the treating solution through the well and into the targeted portion of the heap, to displace residual fluids left from the hydraulic fracturing and to saturate the targeted portion of the heap with the treating solution. As a further enhancement, after a reasonable residence time to permit the treating solution to dissolve metal of interest, collection of the treating solution is aided through displacement with a rinse fluid introduced into the heap through the well. Displacement with the rinse solution enhances mobility of the treating solution within the heap and promotes movement of the treating solution through the heap to a collection system where the treating solution can be collected for further processing to recover dissolved metal. In yet a further enhancement, the rinse solution can also be a leach solution for the metal of interest, to thereby dissolve still more metal from the identified portion of the heap. The rinse treatment could then be repeated multiple times at a frequency as appropriate to ensure effective metal extraction from the remedially treated portion of the heap.

The invention is applicable for treatment of heaps of a variety of metal containing mineral materials. For example, the mineral material in the heap could be an ore, an ore concentrate, a particulate residue from other mineral processing operations or combinations thereof. Also, the metal extracted from the heap could comprise precious or nonprecious metal. In one embodiment, precious metal selected from the group consisting of gold, silver and combinations thereof is extracted from the heap and recovered. In another embodiment, one or more base metal is extracted and recovered, either with or without recovery also of precious metal. The method of the invention may be included as part of a recovery plan in the initial design of new heap leach operations for metal extraction operations. The method of the invention may also be used as a supplemental, add-on technique to improve performance of existing heap leach operations. As yet another possibility, the method of the invention could be used as a salvage technique to extract additional

DETAILED DESCRIPTION

Figure 1:
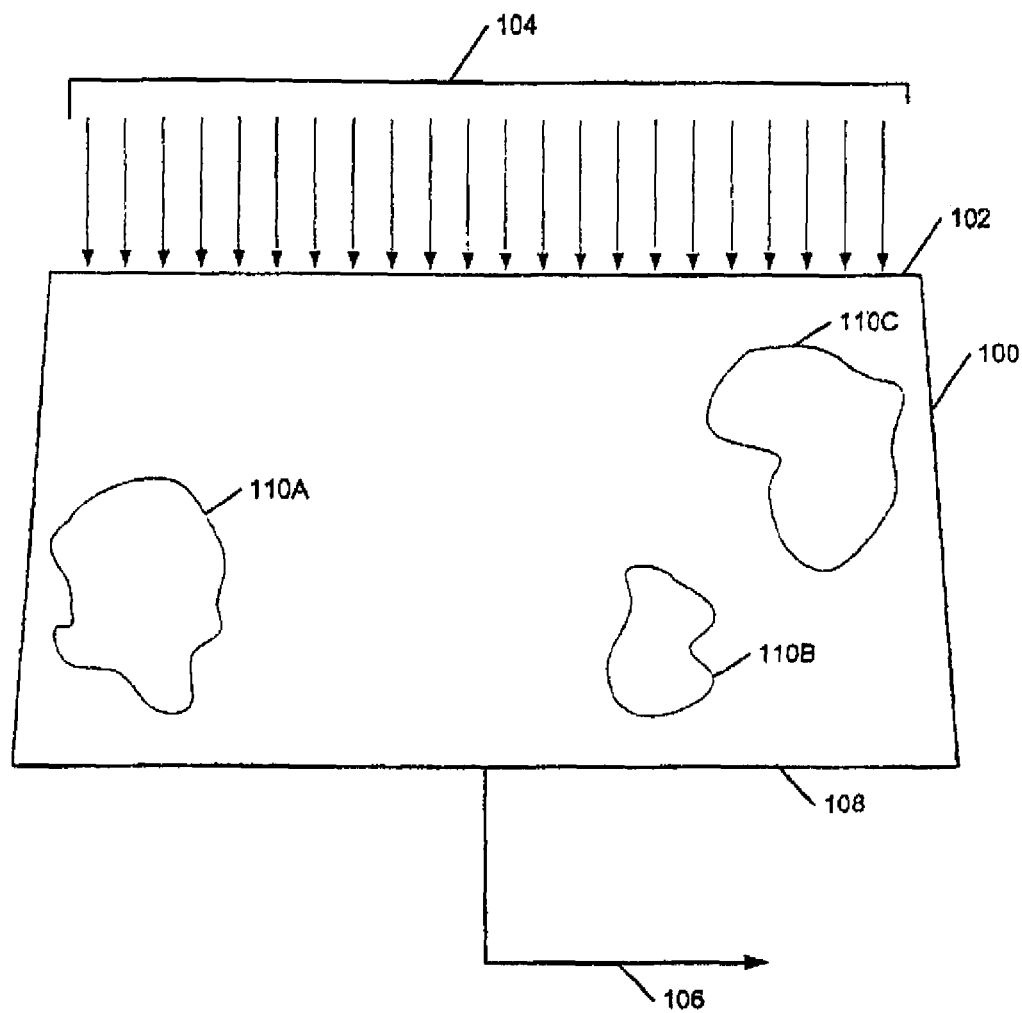
FIG. 1 shows a schematic of a heap undergoing heap leaching and containing under-leached portions.

Figure shows in cross section a heap 100 constructed of particulate gold-bearing mineral material undergoing heap leaching to extract gold, with or without concurrent extraction also of other metal values of interest. Gold is leached from the heap 100 by applying barren feed of leach solution 104, containing a lixiviant for gold, to the top 102 of the heap 100. The leach solution may comprise, for example, cyanide, thiourea, thiosulfate and/or thiocyanate material as lixiviant for gold. The feed 104 of the leach solution may be applied to the top 102 of the heap, for example, by a spray or drip irrigation-type system. The leach solution percolates through the heap 100 and dissolves gold. Pregnant effluent 106 of the leach solution, loaded with dissolved gold, is collected at the base of the heap 108 and is sent to a gold recovery operation to remove the dissolved gold from the pregnant effluent 106 of the leach solution.

As shown in FIG. 1, there are some portions 110A-C of the heap 100 that remain deficient in metal extraction (not adequately leached or substantially not leached) even after the heap leaching operation has been continued for an extended time. By a portion of the heap being deficient in extraction of a component (such as the exemplified metal component), it is meant that extraction of a the component of interest, in this case gold, is low from that portion of the heap 100 in comparison to average extraction from the heap 100. For example, extraction of the component from the deficient portion may be less than half of the average component extraction from the heap 100. Such under-leached or un-leached portions 110A-C may result from one or a combination of characteristics. For example, the chemical characteristics of portion 110A may not be conducive to good gold extraction. When leaching gold with an alkaline cyanide solution, low pH areas may not leach as well as high pH areas and may also be more susceptible to plugging, such as from precipitation of gypsum or other precipitates. As another example, the mineral material particle size and size distribution characteristics, including to what extent there is particle settling within the heap, in portion 110C may result in reduced permeability to the leach solution and therefore may not adequately infiltrated and contacted by the leach solution to dissolve available quantities of gold. Other reasons for deficiency in metal extraction from portions 110A-C are also possible. If the deficient gold extractions in portions 110A-C were not remedied, significant available gold value would remain unrecovered, representing a potentially significant loss.

Figure 2:
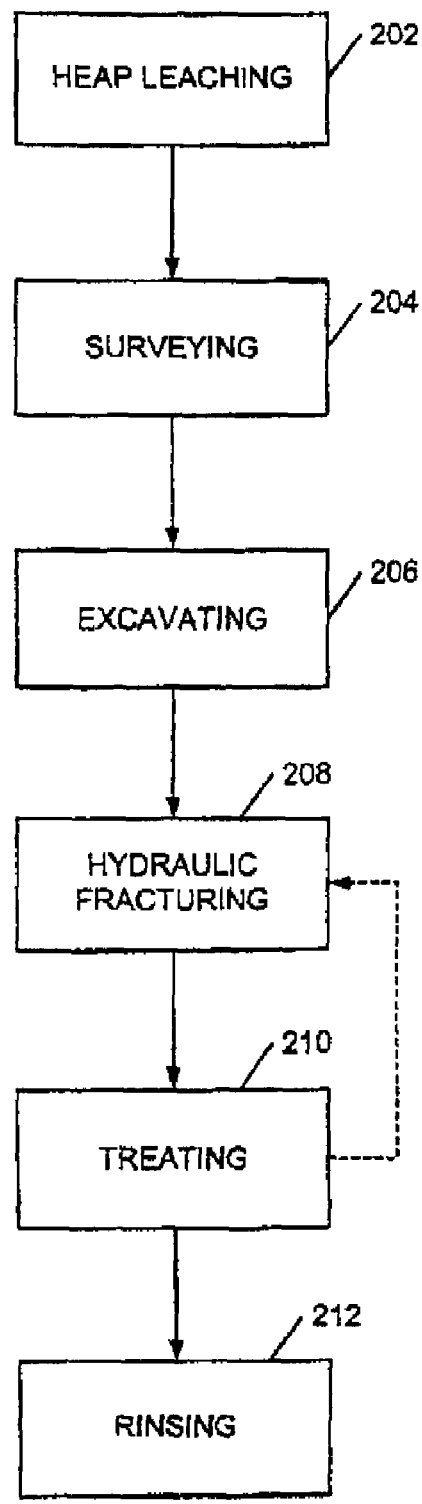
FIG. 2 shows a process block diagram of one embodiment of the invention involving remedial treatment of a heap.

FIG. 2 shows a process block diagram of one embodiment of the invention involving remedial treatment of portions of a heap to enhance recovery of component(s) of interest. The discussion of FIG. 2 will be exemplified by a discussion concerning treatment of a heap of particulate gold-bearing mineral material to extract gold. As shown in FIG. 2, the heap is subjected to heap leaching 202 to extract gold from the mineral material by dissolution into a leach solution containing a lixiviant for the gold. During the heap leaching 202 feed of barren leach solution is applied to the heap. As the leach solution percolates through the heap, it contacts the mineral material and dissolves gold. The heap would typically be constructed over an engineered liner and solution collection system for collection of pregnant leach solution that is loaded with dissolved gold. Effluent of pregnant leach solution collected from the heap is directed to a gold-recovery operation (not shown) to remove dissolved gold from the pregnant leach solution. Barren leach solution from the gold-recovery operation may then be cycled, after treatment as appropriate, back to the heap for additional leaching.

With continued reference to FIG. 2, after the heap has been subjected to the heap leaching 202 for at least some period of time to extract gold, then the heap is subjected to surveying 204 for the purpose of identifying portions of the heap that are deficient in gold extraction that might be appropriate candidates for selective remedial treatment to improve gold extraction. A result of the surveying is determination of the spatial and vertical location (e.g., x, y, and z coordinates) relative to the engineered liner and collection system of portions of the heap that may be deficient in gold extractions and may, therefore, be candidates for remedial treatment to improve gold extraction. During the surveying 204, data is collected concerning properties within the heap and the data is analyzed to identify anomalies indicative that gold extraction is likely deficient in the areas of the anomalies. The data collection may involve physical sampling of the heap and analysis of the physical samples. For example, the heap could be evaluated through systematic drilling of test holes to obtain physical samples from various lateral locations and at various depths within the heap. The samples could be analyzed to determine relevant properties at different locations in the heap. Analysis could determine, for example, one or more of the following: gold assay, dissolved gold values, permeability, compaction, particulate size distribution, fluid saturations, net carbonate values, percent moisture, mineral characterization and other laboratory tests that could aid in characterizing the heap material.

Because such physical sampling of the heap is expensive, it is preferred that data collection during the surveying 204 instead involve mostly or entirely data collected without such physical sampling, reducing and preferably eliminating the need for such test holes. Data collection techniques that do not require any significant physical penetration of the heap are for convenience referred to herein as "noninvasive" data collection techniques.

Examples of noninvasive data collection techniques include geophysical surveying techniques. Geophysical surveying may be classified into two groups, active and passive. With passive geophysical surveying, measurements are made of naturally-occurring fields or properties of the earth in the area being surveyed. Examples of passive geophysical surveying techniques include gravity and magnetic surveys. Spatial variations in the gravitational and magnetic fields are measured in an attempt to infer some condition or conditions about the subsurface geology. Examples of other properties that could be the subject of passive geophysical surveying include radiometric decay products and electrostatic fields. Active geophysical surveys involve injecting a signal into the earth and detecting the earth's response to the signal. These injected signals could be of a variety of forms such as displacement signals, electrical current signals, radar, or signals from an active radiometric source or x-ray. With active geophysical techniques, sensors for detecting response signals may be inserted into or buried near the surface of the heap, avoiding the significant penetration of the heap required of test holes for physical sampling. In some embodiments, the surveying 204 may involve more than one type of minimally invasive data collection.

After the surveying 204, the heap is subjected to excavating 206, during which at least one treatment well is excavated to extend into a portion of the heap identified during the surveying 204 for remedial treatment. The excavating 206 involves drilling, or otherwise forming, a hole to the appropriate depth, as well as completing and preparing the hole as a well for use to remedially treat the identified portion of the heap. The hole for the well extends from a location on the surface of the heap into the heap to a depth extending into the identified portion, but the hole should terminate at an adequately safe distance from the liner and collection system identified during the surveying 204. The hole for the well is preferably formed by drilling into the heap. The drilling may be performed using a rotary drill, pneumatic drill or other suitable technique. One preferred drilling technique is dual rotary drilling. With dual rotary drilling, casing pipe is inserted into the hole as the hole is being drilled. Inserting casing pipe into the hole as it is being drilled is particularly beneficial for drilling holes in poorly consolidated or unconsolidated material, such as is typical in heaps. After the hole has been drilled and the casing pipe inserted to the desired depth, then the casing pipe is secured in place to provide structural integrity to the well. Preferably, the casing pipe is secured in place with an appropriate grout, cement or other sealant material. Such sealant material should preferably seal the bottom of the casing pipe, and should also preferably seal around the outside of casing pipe, to prevent fluid communication along the outside wall of the casing pipe. After the casing pipe has been secured, the casing pipe may then be perforated at desired locations within the well to establish fluid communication between the inside of the well and the heap. The number of perforations and the phasing angle of the perforations may be designed to accommodate any particular flow characteristics. In one embodiment, separate sets of perforations may be located at different depths within the well to permit controlled delivery of fluid into distinct zones located at different depths in the heap. In this embodiment, one enhancement is to design the size, spacing and number of perforations at each zone so that the flow of fluid from the well will be approximately equal into each of the different zones based on gravity feed of fluid from a fluid column filing the well, especially during a subsequent rinsing operation, discussed below. Consideration may also be given to the particular flow characteristics of the heap at each location, such as the local permeability in the different zones of the heap. The depth, spacing and number of perforation zones would preferably vary with the physical characteristics of the mineral material in the heap, and would promote maximum contact of leach solution throughout the portion of the heap to be treated, and without excessive solution channeling and short-circuiting.

Information about the characteristics of the heap may be obtained, for example, by collecting representative sample of the heap at different depths during drilling of the well, and analyzing the samples to determine relevant characteristics of the heap in the locations where the samples are collected. Samples may be tested to determine characteristics such as percent moisture, gold values, dissolvable gold values and the current extent of gold extraction. In addition, permeability characteristics may be estimated by examining the size and size distribution of the particulates in the samples. Using the characteristics of the representative sample, a 3-dimensional map of properties of the heap or of identified portions of the heap could be constructed if desired.

After the excavating 206, the heap is subjected to hydraulic fracturing 208 through the completed treatment well. During hydraulic fracturing 208, fluid is pumped into the well and through the perforations to develop sufficient pressure to open voids, or fractures, within the portion of the heap identified for remedial treatment. The same basic techniques are used as are well known for hydraulic fracturing of oil and gas wells in the oil and gas industry, but with different solution chemistry. Preferably, during the hydraulic fracturing 208, the perforations to be treated are fluidly isolated within the well to ensure that working fluids used during the hydraulic fracturing 208 are confined to the area of those perforations. Isolation of the perforations may be accomplished, for example, by the use of isolation packers, or other sealing devices, located above and below the perforations of interest. Such isolation packers may be disposed in spaced relation at the end of a string of drill pipe (or other working pipe), with a perforated pipe section or a fluid port located between the packers to permit injection under pressure of fluids from the drill pipe through the perforations and into the heap. The isolation packers may involve any kind of device design for sealing off the perforations of interest from the remainder of the well volume, such as for example any of a variety of inflatable packers that may be used in the oil and gas industry. After isolating the perforations of interest, fluids are injected through the perforations to effect the desired hydraulic fracturing operation. Specifics of one embodiment of steps, or phases, for one preferred implementation of the hydraulically fracturing 208 is discussed below with reference to FIG. 3.

With continued reference to FIG. 2 as exemplified in an application for recovery of gold, after the hydraulic fracturing 208 the heap is subjected to treating 210 to promote dissolution of gold from a portion of the heap impacted by the hydraulic fracturing 208. During the treating 210, a treating solution containing a lixiviant for gold is injected through the well into the heap. The treating solution may be the same as or different than the leach solution used during the heap leaching 202. Preferably, the treating solution has properties that are the same or similar to barren leach solution applied to the heap during the heap leaching 202. The treating solution permeates the identified portion of the heap to fill both fracture voids left from the hydraulic fracturing 208 and also the pore space of adjacent unaffected areas of the heap, thereby contacting the mineral material and dissolving gold from the remedially treated portion of the heap. Because the treating solution is injected directly into a targeted portion of the heap, it will not be subject to normal environmental degradation experienced when leach solution is applied to the surface of a heap during normal heap leach operations. As a result, leaching of the gold in the remedially treated portion of the heap preferably occurs relatively quickly. The treating solution injected into the heap during the treating 210 can be supplemented as desired with one or more reagents (gas, solid or liquid). For example, for cyanide leaching of gold, it is preferred to mix air into the treating solution prior to introduction into the heap. This may be accomplished for example, by injecting air into the treatment solution upstream of an in-line static mixer. The treating 210 is preferably performed immediately following the hydraulic fracturing 208 while the perforations of interest remained isolated as described previously for the hydraulic fracturing 208. During the treating 210, the treating solution displaces residual fluids left from the hydraulic fracturing 208, saturating the portion of the heap to be remedially treated.

When the treatment well was completed with separate sets of perforations into different zones within the well, the hydraulic fracturing 208 and treating 210 steps may be performed first on one zone of perforations (preferably the lower-most set of perforations) and then the hydraulic fracturing 208 and treating steps 210 may be systematically repeated on each of the other zones (preferably moving sequentially upward in the well). Separate treatment of the individual zones provides greater control to promote effective fracturing of the target portion of the heap and subsequent saturation with treating solution, thereby promoting more effective remedial treatment to recover gold. Such optional sequential treatment of multiple zones is depicted by the dashed line in FIG. 2. As an example, after completing the hydraulic fracturing and the treating on a first zone lower in the well, the isolation packers could be released and the drill pipe raised to treat a second, higher zone. The isolation packers would then be reset to fluidly isolate the second zone and the hydraulic fracturing 208 and treating 210 would then be repeated on the second zone. The hydraulic fracturing step 208 and the treating step 210 could be repeated in this fashion until all zones of interest have been treated.

In the embodiment shown in FIG. 2, after the treating 210, the treated portion of the heap is then subjected to rinsing 212. During the rinsing 212, a rinse solution is injected through the well into the heap solution. Completion of the treating 210 and commencement of the rinsing 212 should be separated by a sufficient period of time to permit the treating solution to effectively dissolve gold from the portion of the heap that is being remedially treated, which time period may be several days or even several weeks. During this intervening time, some of the treatment solution may have drained out of the heap and been collected for processing to recover gold. Often, however, some or even most of the treating solution will remain saturating the treated portion of the heap. When injected into the heap through the treatment well, the rinse solution will tend to displace the treatment solution, assisting mobility of the treatment solution within the heap and, ultimately, assisting collection of the treatment solution through the collection system. The rinse solution is preferably also a leach solution capable of dissolving additional gold from the heap. The rinse solution will often be similar to or the same as the treating solution used during the treating 210 and also similar to or the same as the leach solution applied to the heap during the heap leaching 202. In one embodiment of the rinsing 212, the rinse solution is introduced into the heap relatively slowly to reduce the potential for fluid channeling in the heap and to promote even saturation by the rinse solution throughout the targeted portion of the heap. For example, fresh leach solution may be introduced into the top of the treatment well and allowed to fill or mostly fill the well, with the fluid column in the well providing some or all of the pressure differential to force the rinse solution through the perforations and into the heap. A moderate pump pressure may, however, also be applied to the top of the well, if desired. In one preferred embodiment, when the well is completed with multiple distinct sets of perforations in different zones, the perforations at each zone in the well are designed so that the flow of rinse solution will be roughly equal into each zone, taking into account the depth, permeability and other characteristics of each zone. The introduction of rinse solution into the well will preferably be continued until substantially all of the treating solution has been displaced from the treated portion of the heap and replaced with the rinse solution. In one preferred embodiment, introduction of rinse solution into a treated portion of the heap is discontinued prior to attaining a steady state condition between inflow of rinse solution into the heap from the well and outflow of solution from that portion of the heap. The rinsing 212 may be repeated multiple times, with time intervals between the repetitions selected based on the specific kinetics for leaching gold from the particular mineral material of the heap, or at other intervals as convenient or as desired. Treating solution and rinse solution that drains from the heap loaded with dissolved gold is collected, and can be directed to a gold recovery process to remove the dissolved gold. When leaching operations are to be discontinued on a heap, a final rinse could be performed that does not contain a lixiviant for the gold. This final rinse would be to displace remaining solution containing dissolved gold from the treated portion of the heap. This final rinse might use, for example, process water as the rinse solution.

With continued reference to FIG. 2, it is noted that the heap leaching 202 may continue to be performed simultaneously with, or alternatively may be discontinued during, any portion of the surveying 204, excavating 206, and hydraulic fracturing 208, treating 210 and rinsing 212. For example, application of barren leach solution to the top of the heap during the heap leaching 202 could continue over some or the entire heap to percolate through the heap and continue to extract gold from those portions of the heap not in need of remedial treatment. As another example, the heap leaching 202 may be temporarily suspended over all or any part of the heap as is convenient while performing any portion of the surveying 204, excavating 206, and hydraulic fracturing 208, treating 210 or rinsing 212. Moreover, the heap leaching 202 may be permanently discontinued prior to or during performance of any of the surveying 204, excavating 206, hydraulic fracturing 208, treating 210 and rinsing 212. If the heap leaching 202 is permanently discontinued, then gold extraction via remedial treatment of the identified portions may represent the final effort at gold recovery from the heap.

Also, it should be recognized that the remedial treatment sequence of excavating 206, hydraulic fracturing 208, treating 212 and rinsing 212 may be independently performed at several different locations on the heap to remedially treat different portions of the heap identified as being deficient in gold extraction. Also, in some instances, a portion of the heap identified as being deficient in gold extraction may be so large that multiple treatment wells are drilled into that portion to ensure effective remedial treatment of the entire portion.

Also, in a preferred embodiment involving extraction of gold, the same lixiviant for gold is typically used in the leach solution used during the heap leaching 202, the treating solution used during the treating 210 and the rinse solution used during the rinsing 212. Moreover, it is normally desirable that these solutions all be chemically compatible. For example, if the heap leaching 202 is being conducted with an aqueous alkaline cyanide solution, the treating solution and the rinse solution would preferably also be aqueous alkaline cyanide solutions. If the leach solution were an aqueous alkaline thiosulfate solution, the treating and rinse solutions would preferably also be aqueous alkaline thiosulfate solutions. Often, the treating solution and the rinse solution will be sourced from the leach solution that is used for the heap leaching 202.

Figure 3:
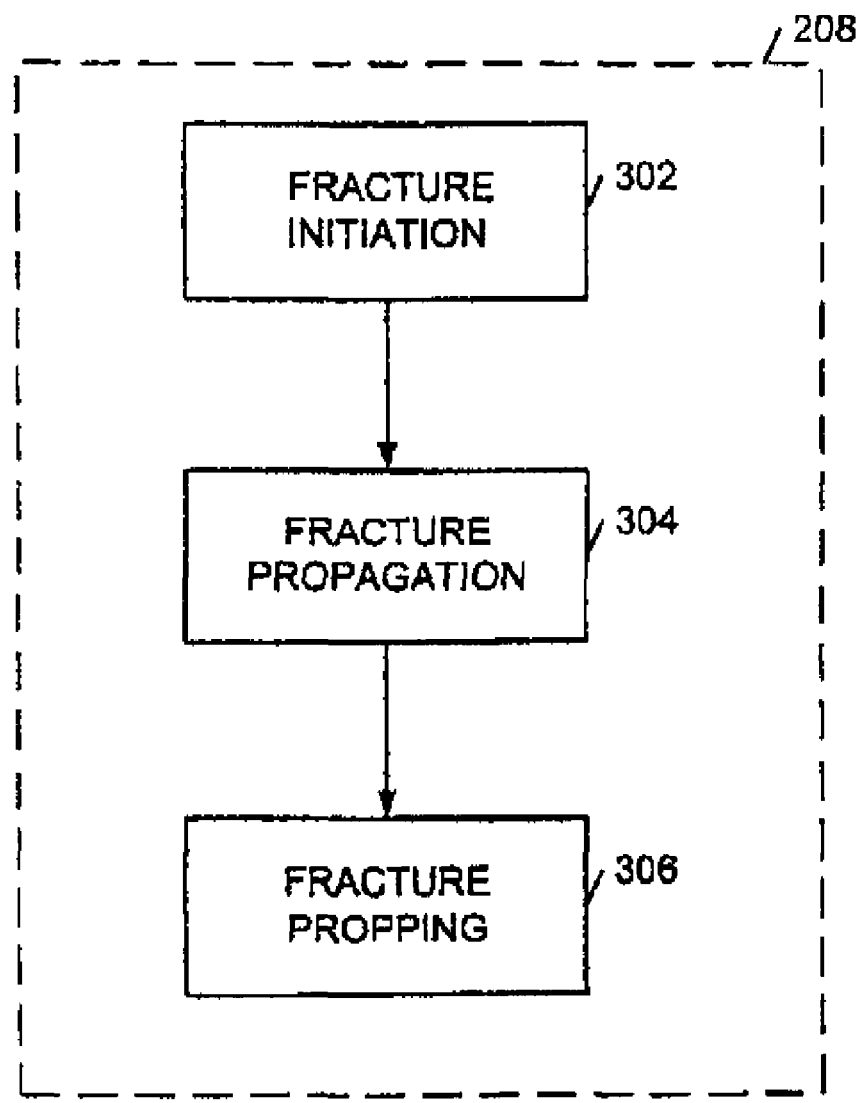
FIG. 3 shows a process block diagram of one embodiment for phases, or steps, during hydraulic fracturing a heap as part of remedial treatment.

Referring now to FIG. 3, a process block diagram is shown for one embodiment of more specific steps, or phases, during the hydraulic fracturing 208, which was discussed more generally with respect to FIG. 2. As with FIG. 2, the discussion with respect to the implementation of FIG. 3 will be exemplified with treatment of a gold-bearing mineral material for extraction of gold. A first step shown in FIG. 3 is fracture initiation 302. During the fracture initiation 302, fracture fluid is injected through the well into the heap at a rate and pressure sufficient to open within the heap one or more voids, or fractures. The flow rate and pressure of the fracture fluid being injected into the heap will typically be monitored. When the flow rate reaches a constant or decreasing value and the pressure reaches a maximum, an induced voidage or set of fractures (i.e. one or more fractures) will initiate in the heap. The occurrence of fracture initiation 302 is generally confirmed by a sudden drop in the fracture fluid injection pressure accompanied by a rapidly increasing injection flow rate.

After the fracture initiation 302, the next step is fracture propagation 304. During the fracture propagation 304, fractures initially opened during fracture initiation 302 are opened further, widening the voids and extending the voids deeper into the heap away from the perforations of the treatment well. The fractures are propagated during the fracture propagation 304 with continued pumping of the fracture fluid into the heap at a flow rate sufficient to maintain an injection pressure in the heap that is high enough to prevent fracture voids from closing and to propagate the fractures further into the heap. During the fracture propagation 304, the injection pressure of the fracture fluid is typically held relatively constant, which is accompanied by a generally increasing injection flow rate as the volume of fracture voids continues to increase. Fracture propagation is continued until fractures have been propagated to a desired extent, or until processing conditions otherwise warrant. For example, depending upon conditions in the heap, as the fractures propagate, the injection flow rate for the fracture fluid may be increase to an unsustainable level and further propagation of the fracture will have to be discontinued for practical reasons. Also, the fracture propagation 304 may be discontinued to limit the total amount of fracture fluid introduced into the heap.

After the fracture propagation 304, a fracture propping 306 step follows. During the fracture propping 306, a particulate proppant material is placed within open fracture voids to help prevent closure of the fracture voids following completion of the hydraulic fracturing 208. The proppant may be of any suitable material. A typical proppant will comprise silica particles (sand, for example), preferably sized within a range having an upper limit of about 10 mesh and a lower limit of about 40 mesh. The proppant is transported into open fracture voids in slurry comprising the proppant and a carrier fluid. Depending upon the specific situation the fractures may continue to propagate, may contract, or may remain about the same during the fracture propping 306. It is preferred that the proppant not significantly settle out of the carrier fluid prior to effective transportation of the proppant into the fracture voids. The carrier fluid will, therefore, often be a high viscosity liquid with a high carrying capacity for the proppant. After a desired quality of proppant slurry has been pumped, the pumping of carrier fluid/proppant slurry is discontinued and a volume of displacement fluid is pumped to flush remaining proppant from the working pipe and the isolated volume within the well adjacent the perforations. This displacement fluid may be the same fluid used as the carrier fluid, but without proppant, or may be some other liquid. The displacement liquid may be, for example, the same as the treating liquid used during the treating 210 (FIG. 2).

Figure 4:
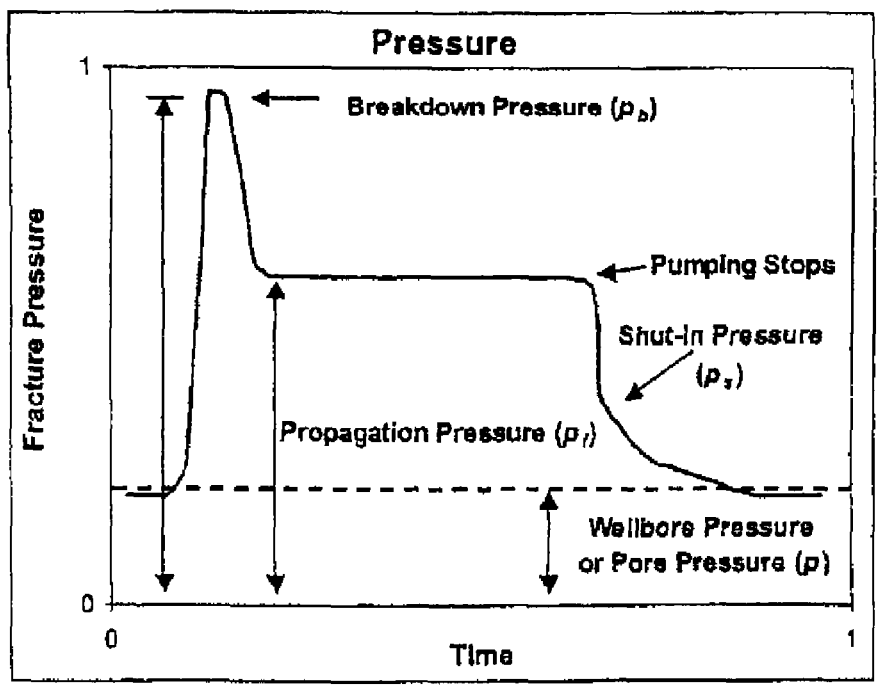
FIG. 4 shows an example plot of pressure profile vs. time during hydraulic fracturing of heap as part of a remedial treatment.
Figure 5:
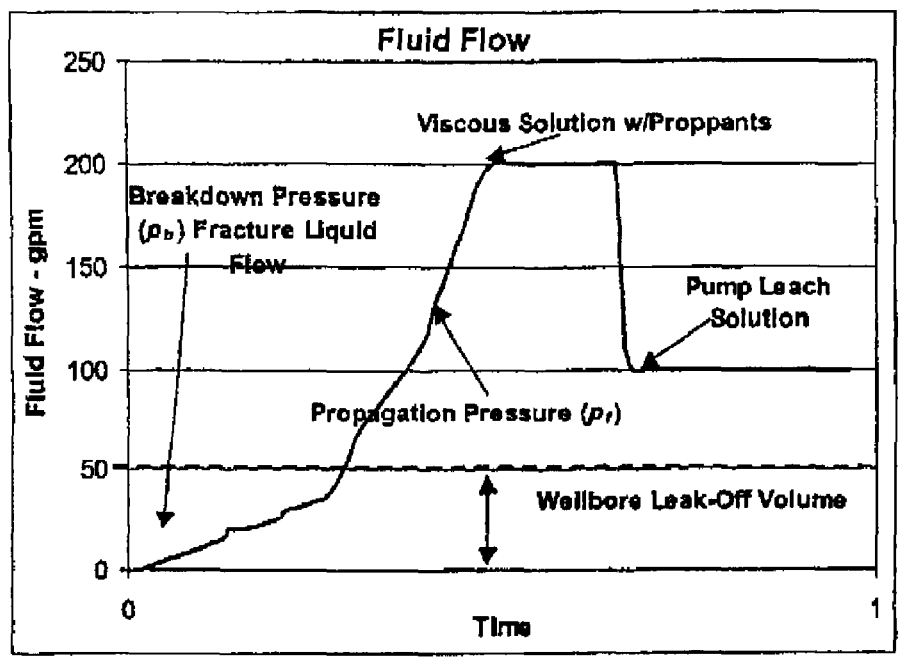
FIG. 5 shows an example plot of fluid flow rate profile vs. time during hydraulic fracturing a heap as part of a remedial treatment.

It is important that all fluids used during the hydraulic fracturing 208 are compatible both with the chemistry of the heap and with solutions used during the heap leaching 202, the treating 210 and the rinsing 212 (FIG. 2), and also with the chemistry of the recovery system. For example, when gold is being extracted from the heap under alkaline conditions with cyanide or thiosulfate lixiviant, the fracture fluid might comprise for example an alkaline or neutral pH aqueous liquid, and the carrier fluid and displacement fluid might comprise a viscous milk of lime solution. After the fracture propping 306 (FIG. 3), the treating 210 (FIG. 2) can then be performed. FIGS. 4 and 5 show graphical plots demonstrating examples of pressure and fluid flow profiles, respectively, that might be expected during the hydraulic fracturing 208 and treating 210 steps (FIGS. 2 and 3).

Figure 6:
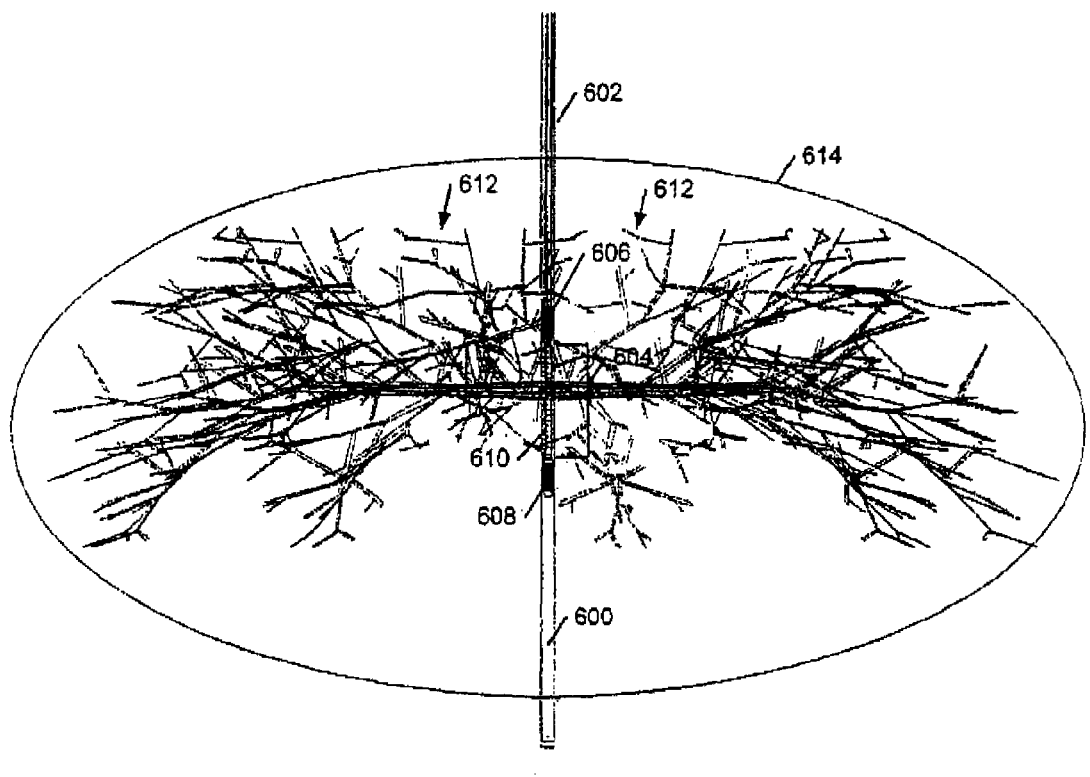
FIG. 6 shows a schematic of a treatment well extending into a portion of a heap that has been hydraulically fractured as part of a remedial treatment.
Figure 7:
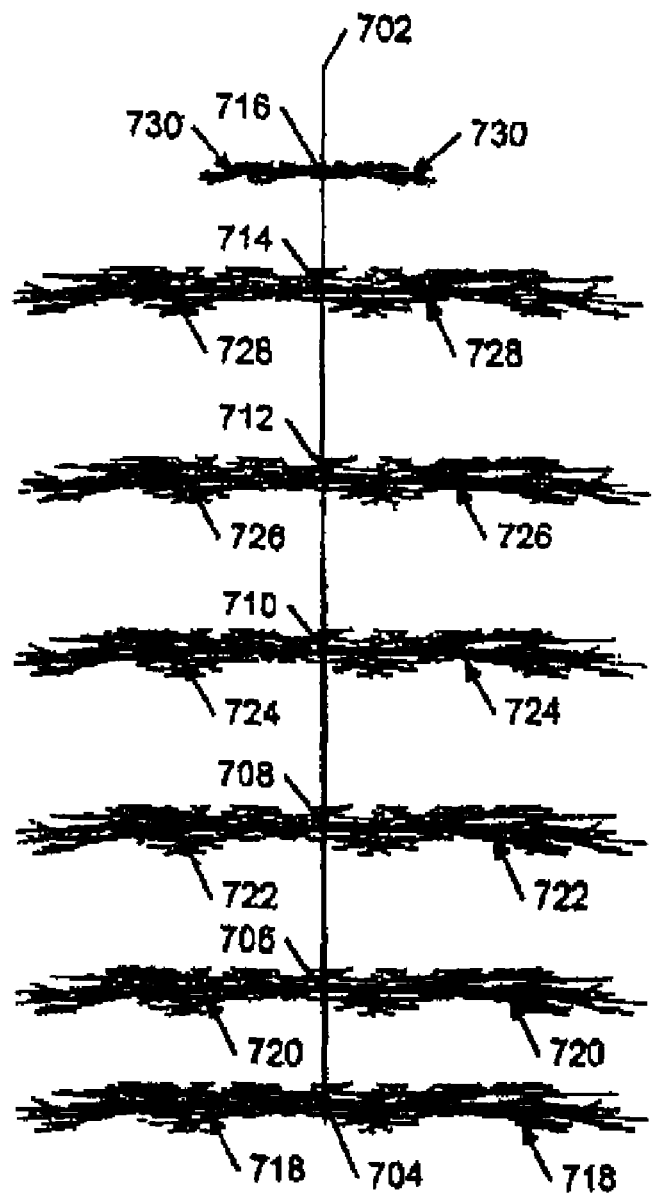
FIG. 7 shows a schematic of a treatment well extending into a portion of a heap that has been hydraulically fractured in multiple vertically spaced zones as part of a remedial treatment.

To further aid understanding of the invention, reference is now made to FIGS. 6 and 7. FIG. 6 shows a schematic of a well 600 extending into a portion of a heap that has been hydraulically fractured to create fractures 612 in the heap adjacent to the well 600. Casing pipe 602 of the well is perforated in zone 604. The perforations of zone 604 are fluidly isolated between isolation packers 606 and 608. The isolation packers 606 and 608 are disposed at the end of working pipe (e.g., drill pipe) extending into the well 600 from the surface of the heap. A perforated pipe section 610 disposed between the isolation packers 606 and 608 provides fluid communication between the inside of the working pipe and the perforations of zone 604, to permit fluids to be pumped through the working pipe for injection into the heap through the perforations of zone 604. Also shown in FIG. 6 is an impacted zone 614 within the heap. The impacted zone 614 generally represents a volume within the heap considered to be significantly affected by permeability modification via the fractures 612. The impacted zone 614 is, therefore, representative of a volume within the heap that would be expected to receive most of the benefit from remedial treatment. FIG. 7 shows a schematic of a well 702 including perforations into multiple zones 704, 706, 708, 710, 712, 714 and 716 that have each been selectively subjected to hydraulic fracturing according to the invention to create the different sets of fractures 718, 720, 722, 724, 726, 728 and 730.

Figure 8:
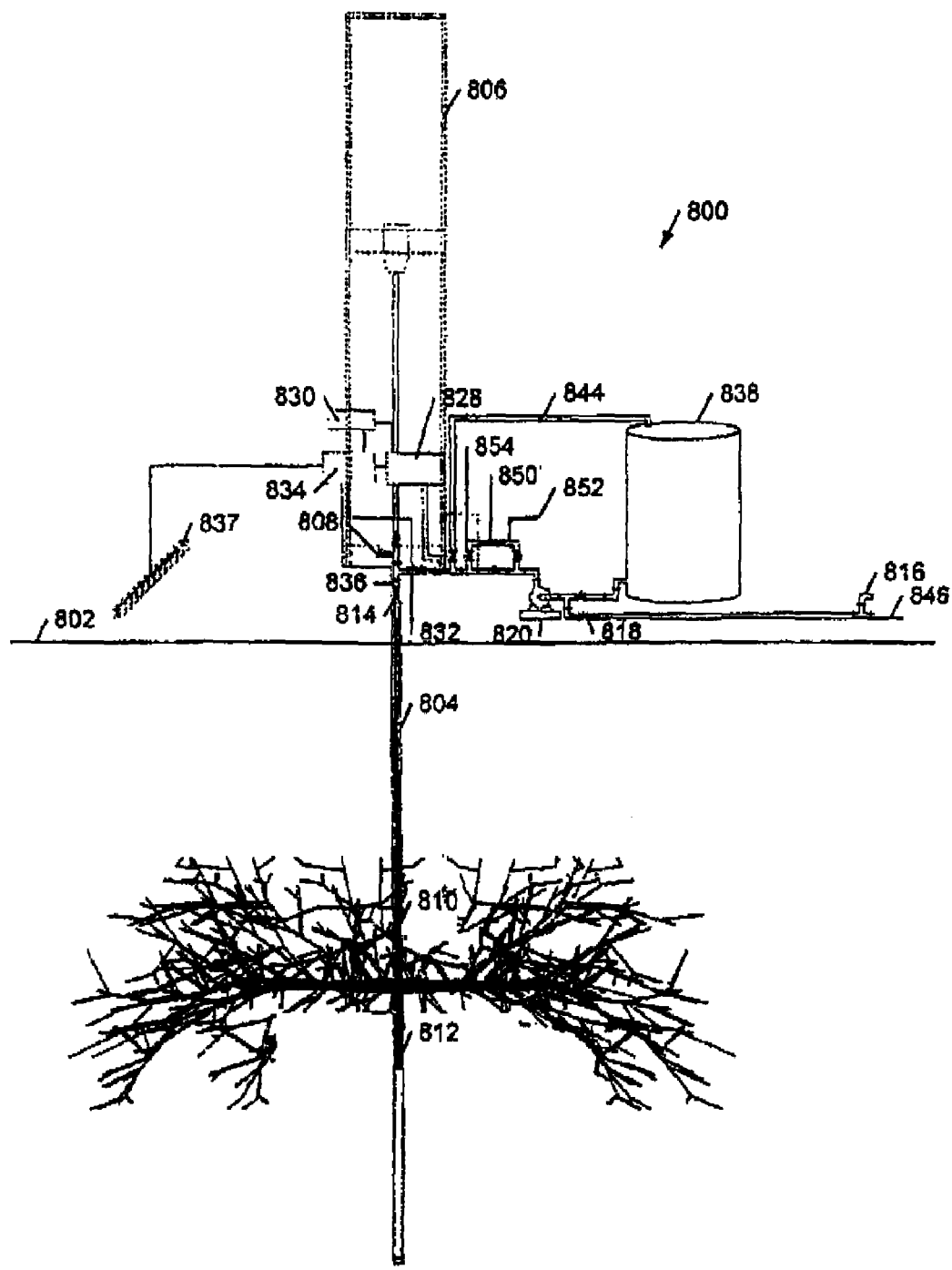
FIG. 8 shows schematic of one embodiment of a system for hydraulically fracturing and treating a portion of a heap through a treatment well extending into the portion of the heap.

With reference now to FIG. 8, a schematic of an example of one embodiment of a system for use during remedial treatment with the invention is shown. As shown in FIG. 8, a system 800 is located on the surface 802 of a heap of gold-bearing mineral material that has been, and may still be undergoing, heap leaching. The system 800 includes a well 804 extending into a portion of the heap identified as being deficient in gold extraction and appropriate for remedial treatment. The system 800 includes a derrick 806 for manipulating working pipe that extends into the well 804. At the lower end of the working pipe, isolation packers 810 and 812 are used to fluidly isolate zones within the well for remedial treatment. An inlet 814 is provided for introduction of compressed gas for transmission to the isolation packers 810 and 812 for setting and releasing the isolation packers 810 and 812. The system 800 also includes a pump (or pumps) 820. The discharge side of the pump 820 is fluidly connectable through piping and valving with the working pipe to permit injection of fluids through the well via the working pipe during remedial treatment operations. The inlet side of the pump 820 is fluidly connectable through piping and valving to any of a fluid containment tank 838, a fresh water source 816 and a leach solution source 846 as sources of fluids for use during remedial treatment operations. For example, for remedial treatment of a heap undergoing cyanide heap leaching, fresh water from the fresh water source 816 may be used as a fracture fluid and a slurry of milk of line and sand contained in the fixed or mobile tank 838 may be used to supply proppant to prop open fractures during hydraulic fracturing, and barren leach solution from the barren leach solution source 846 may be used as treating solution and/or rinse solution following hydraulic fracturing. An in-line static mixer 850 permits reagent that may be added from a reagent source 852 to be thoroughly mixed and dispersed in discharge from the pump 820 prior to injection into the heap. For example, when injecting barren leach solution for gold extraction, air or other gases could be injected into a slipstream and mixed in the mixer 850. The system 800 also includes a pressure sensor 832 and flow meter 836 electronically interconnected with a data logger 834 for monitoring and recording injection pressures and flow rates. The data logger is also interconnected with a tilt meter 837 for monitoring and recording movements of the surface 802 of the heap as an indication of fracture propagation during hydraulic fracturing. Although only one tilt meter 837 is shown, preferably a number of tilt meters would be used to monitor ground movement at various locations surrounding the location of the well 804. The system also includes a controller 828 electrically interconnected with valves and other control equipment for effecting control of fluid flows during operation of the system. The data logger 834 and the controller 828 are electrically interconnected with a computer 830 that is used to monitor and control operation of the data logger 834 and the controller 828. The system 800 also includes a sample port 808 for taking fluid samples from the working pipe.

The foregoing description has been made primarily with reference to an implementation of the invention involving treatment of a gold-bearing mineral material in heap leach operations. The present invention is not, however, limited to recovery of gold or only to treatment of gold-bearing mineral materials, and the same principles as discussed above apply also to recovery of one or more other minerals, metals, compounds or other components from the heap, suitably modified with appropriate leach solutions for the other component(s) of interest. The present invention may be used, for example, in heap leach operations to extract along with gold other metal values of interest that might also be contained in gold-bearing mineral materials, such as, for example, silver or copper.

In one application of the invention, a base metal-containing mineral material is treated to extract base metal. The mineral material may or may not also contain precious metal to be extracted. For example, the mineral material in the heap may contain one or more base metal, such as for example one or more of copper, nickel, zinc, lead, cobalt and iron that is a target of extraction. Heap leaching of the base metal may, depending upon the circumstances, be conducted using a neutral pH, alkaline or acidic leach solution. Consistent with the discussion above with respect to gold extraction, solutions used during the remedial treatment operations should preferably be compatible with each other and with the leach solution used to extract the base metal during heap leaching operations. For example, when the heap leaching involves acidic sulfate leaching of copper and/or other base metal(s), the carrier liquid used to carry proppant might be a viscous sulfuric acid solution. Also, it will be appreciated that heap leaching operations may operationally vary somewhat depending upon the particular component(s) being recovered. For example, mineral material subjected to heap leaching for extraction primarily of gold is often comminuted to a particle size of from about 12 inches to 1 inch, or from pit rock (Run Of Mine material), or combinations of both and a typical heap may be constructed to a depth of perhaps about 300 to 600 feet. As another example, so-called dump leaching of copper may involve coarse rock of perhaps several inches in size and the heaps (often referred to as dumps) may be constructed to depths of several hundred feet.

Moreover, the foregoing description of the invention has focused on remedial treatment involving hydraulic fracturing as one step, but the invention also includes embodiments in which some other remedial operation is performed instead. For example, the treating 210 and rinsing 212 (FIG. 2) could be performed without the hydraulic fracturing 208 if local permeability in the in the target portion of the heap is already sufficiently high. Also, a pH or chemical modification treatment could be performed with or without the hydraulic fracturing, when it is desired only to selectively remedy a pH or other chemical condition or anomaly in the heap and not to remedy for low permeability.

Additionally, the foregoing description of the invention has been exemplified for discussion purposes by reference to recovery of one or more metal component from heaps of mineral material, but the invention is applicable also to recovery of one or more other component from heaps of such mineral material or from heaps of other material. Such component for recovery with the invention could be any material targeted form extraction from a heap constructed of particulate feed material. The principles and techniques described above apply equally to treating other materials, with chemistry suitably modified for the particular material and target component(s) to be extracted. A target component could be, for example, a mineral or compound contained within the heap. For example, mineral materials could be treated in a heap for recovery of uranium, sodium, phosphorus, or any other mineral or compound leachable in a heap, dump or pile.

The foregoing discussion of the invention has been presented for purposes of illustration and description and to disclose the best mode contemplated for practicing the invention. The foregoing is not intended to limit the invention to only the form or forms specifically disclosed herein. Although the description of the invention has included description of one or more embodiments and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described with respect to any disclosed embodiment may be combined in any combination with one or more features of any other embodiment or embodiments. For example, additional processing steps can be included at any point during or after processing disclosed in any of the process embodiments described herein or shown in any of the figures, so long as the additional steps are not incompatible with the disclosed processing according to the present invention.

The terms "comprising", "containing", "including" and "having", and variations thereof, are intended to be inclusive and nonlimiting in that the use of such terms indicates the presence of some condition or feature, but not to the exclusion of the presence also of any other condition or feature.

What is claimed is:

1. A method for extracting a component from a heap of material, the method comprising:
   after the heap has been subjected to component extraction by heap leaching for some period of time, surveying the heap, the surveying comprising collecting data concerning properties within the heap and analyzing the data to identify portions of the heap deficient in extraction of the component in that the extraction of the component in the identified portions of the heap is low in comparison to average extraction of the component from the heap, the collecting data comprising a geophysical survey and the analyzing comprising analyzing data from the geophysical survey; and
   subjecting the heap to selective remedial treatment, the selective remedial treatment comprising:
   based on the surveying, selecting for remedial treatment an identified portion of the heap determined from the surveying to be deficient in extraction of the component in that the extraction of the component in the identified portion is low in comparison to average extraction of the component from the heap;
   excavating a well into the identified portion of the heap; and
   through the well, remedially treating the identified portion of the heap to improve the extraction of the component from the identified portion of the heap, the remedially treating comprising:
      treating the identified portion of the heap, the treating comprising introducing treating solution through the well into the identified portion of the heap and dissolving into the treating solution at least a portion of the component from the identified portion of the heap;
      prior to the treating, hydraulic fracturing the heap within the identified portion of the heap.

2. The method of claim 1, wherein the well is in fluid communication with the heap in multiple zones in the well; and
the method comprises performing the treating separately on each of the zones.

3. The method of claim 1, wherein the hydraulic fracturing comprises:
   fluidly isolating a zone in the well in fluid communication with the heap;
   initiating a fracture through injection under pressure of a fracture fluid into the heap at a location corresponding with the zone; and
   propping the fracture open through deposition in the fracture of proppant particles transported through the well.

4. The method of claim 1, wherein the well is in fluid communication with the heap in multiple said zones in the well; and
the method comprises performing the hydraulic fracturing separately on each of the zones.

5. The method of claim 4, comprising performing the treating separately on each of the zones.

6. The method of claim 1, wherein the treating is performed without prior hydraulic fracturing of the identified portion of the heap.

7. The method of claim 1, comprising collecting from the heap at least a portion of the treating solution containing dissolved component extracted from the heap and removing from the collected treating solution at least a portion of the dissolved component.

8. The method of claim 1, comprising, after the treating, rinsing the identified portion of the heap, the rinsing comprising introducing rinse solution through the well into the identified portion of the heap to displace at least a portion of the treating solution containing dissolved component away from the identified portion of the heap.

9. The method of claim 8, wherein:
   the rinsing comprises dissolving at least a further portion of the component from the identified portion of the heap into the rinse solution; and
   after the rinsing, collecting from the heap at least a portion of the rinse solution and removing from the collected rinse solution at least a portion of the further portion of the component.

10. The method of claim 8, comprising further subjecting the heap to component extraction by leaching from the heap during at least a portion of the rinsing.

11. The method of claim 1, comprising further subjecting the heap to component extraction by leaching from the heap during at least a portion of the treating.

12. The method of claim 1, wherein the component is gold and the treating solution comprises a lixiviant for the gold.

13. The method of claim 1, wherein the component is a base metal.

14. The method of claim 13, wherein the base metal is selected from the group consisting of copper, nickel, zinc, lead, cobalt and iron.

15. The method of claim 13, wherein the base metal is copper and the treating solution is an acidic sulfate solution.

16. The method of claim 1, comprising:
   sampling the heap during the excavating of the well; and
   analyzing at least one property of a sample of the material obtained during the sampling.

17. The method of claim 16, wherein:
   the sampling comprises obtaining multiple said samples from different depths in the heap, different ones of said multiple samples obtained from different depths in the heap; and
   performing the analyzing separately on each of the ones of the samples obtained from different depths.

18. The method of claim 1, wherein the surveying further comprises forming test holes into different portions of the heap and determining a property of the heap at different lateral locations and different depths in the heap.

19. The method of claim 1, wherein the geophysical survey comprises a passive geophysical survey technique.

20. The method of claim 19, wherein the geophysical survey comprises a gravity survey.

21. The method of claim 19, wherein the geophysical survey comprises a magnetic survey.

22. The method of claim 1, wherein the material comprises at least one of an ore and an ore concentrate.

23. The method of claim 1, wherein the heap has a depth of at least 300 feet.

24. The method of claim 1, wherein the material comprises a metal-containing mineral material and the component is a metal.

25. The method of claim 24, wherein the metal is gold and the method comprises:
   leaching gold from the heap, comprising applying a leaching solution to the heap, the leaching solution comprising a lixiviant for the gold.

26. The method of claim 24, wherein the metal is a base metal.

27. The method of claim 26, wherein the base metal is copper.

28. The method of claim 26, wherein the base metal comprises one or more than one of nickel, zinc, lead, cobalt and iron.

29. The method of claim 24, wherein the metal is uranium.

30. The method of claim 24, wherein the metal is sodium.

31. The method of claim 24, wherein the metal is phosphorus.

32. The method of claim 24, wherein the metal is silver.

33. The method of claim 1, wherein the remedially treating comprises modifying pH in the identified portion of the heap.

34. The method of claim 1, comprising excavating a plurality of the wells into a plurality of identified portions of the heap and performing the remedially treating separately through different ones of the wells.

35. The method of claim 1, comprising prior to the remedially treating, extracting at least a portion of the component from the heap by heap leaching.

36. The method of claim 35, comprising further subjecting the heap to component extraction by heap leaching during at least a portion of the remedially treating.

37. The method of claim 36, comprising further subjecting the heap to component extraction by heap leaching after the remedially treating.

38. A method for extracting additional component from a heap of material after the heap has already been subjected to extraction of at least some of the component by prior heap leaching, the method comprising:
   excavating a well into an identified portion of the heap, determined from analyzing data comprising geophysical survey data to be deficient in extraction of the component in that following the prior heap leaching the extraction of the component in the identified portion is low in comparison to average extraction of the component from the heap; and
   through the well, remedially treating the identified portion of the heap to improve the extraction of the component from the identified portion of the heap, wherein the remedially treating comprises:
   (i) hydraulic fracturing the heap within the identified portion of the heap; and
   (ii) after the hydraulic fracturing, treating the identified portion of the heap, the treating comprising introducing treating solution through the well into the identified portion of the heap and dissolving into the treating solution at least a portion of the component from the identified portion of the heap.

39. The method of claim 38, wherein the material comprises a metal-containing mineral and the component is a metal.

40. The method of claim 39, wherein the metal is selected from the group consisting of copper, nickel, zinc, lead and cobalt.

41. The method of claim 39, wherein the metal is gold.

42. A method for extracting additional component from a heap of material after the heap has already been subjected to extraction of at least some of the component by prior heap leaching, the method comprising:
   selectively remedially treating at least one identified portion of the heap, the selectively remedially treating comprising:
      excavating a well into a said identified portion of the heap;
      introducing treating solution into the said identified portion of the heap through the well into the said identified portion of the heap and dissolving into the treating solution at least a portion of the component from the identified portion of the heap;
   wherein prior to the excavating the well, the said identified portion of the heap has been identified for selective remedial treatment from analyzing data comprising geophysical survey data to be deficient in extraction of the component in that following the prior heap leaching the extraction of the component in the identified portion is low in comparison to average extraction of the component from the heap; and
   wherein prior to the introducing the treating solution, the said identified portion of the heap has been hydraulically fractured through the well.

43. The method of claim 42, wherein the material comprises a metal-containing mineral and the component is a metal.

44. The method of claim 43, wherein the metal is selected from the group consisting of copper, nickel, zinc, lead and cobalt.

45. The method of claim 43, wherein the metal is gold.

* * * * *